United States Patent
Erden et al.

(10) Patent No.: US 10,490,219 B1
(45) Date of Patent: Nov. 26, 2019

(54) USING SIGNALS FROM PERPENDICULAR AND LONGITUDINAL MULTITRACK MAGNETIC FIELDS FOR ERROR RECOVERY AND/OR SERVO CONTROL

(71) Applicant: Seagate Technology LLC, Cupertino, CA (US)

(72) Inventors: Mehmet Fatih Erden, St. Louis Park, MN (US); Walter R. Eppler, Cranberry Township, PA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/123,120

(22) Filed: Sep. 6, 2018

(51) Int. Cl.
| | |
|---|---|
| *G11B 5/596* | (2006.01) |
| *G11B 5/48* | (2006.01) |
| *G11B 5/54* | (2006.01) |
| *G11B 5/56* | (2006.01) |
| *G11B 5/58* | (2006.01) |

(52) U.S. Cl.
CPC ........ *G11B 5/59627* (2013.01); *G11B 5/4826* (2013.01); *G11B 5/488* (2013.01); *G11B 5/4813* (2013.01); *G11B 5/4886* (2013.01); *G11B 5/54* (2013.01); *G11B 5/56* (2013.01); *G11B 5/58* (2013.01)

(58) Field of Classification Search
None
See application file for complete search history.

(56) References Cited

U.S. PATENT DOCUMENTS

| | | | |
|---|---|---|---|
| 4,803,571 A | 2/1989 | Fujioka et al. | |
| 5,956,216 A | 9/1999 | Chou | |
| 8,693,134 B1 | 4/2014 | Xi et al. | |
| 8,953,276 B1* | 2/2015 | Pokharel | G11B 5/596 360/75 |
| 8,953,279 B1* | 2/2015 | Mendonsa | G11B 5/59688 360/77.08 |
| 9,087,541 B1 | 7/2015 | Pokharel et al. | |
| 9,245,579 B2 | 1/2016 | Song et al. | |
| 9,741,369 B2* | 8/2017 | Batra | G11B 20/10009 |
| 9,818,445 B2 | 11/2017 | Zhu et al. | |
| 9,824,703 B2 | 11/2017 | Sugawara et al. | |
| 9,865,291 B1* | 1/2018 | Pokharel | G11B 5/59688 |
| 9,875,758 B1* | 1/2018 | Trantham | G11B 5/29 |
| 9,972,349 B1 | 5/2018 | French, Jr. et al. | |
| 10,002,625 B1 | 6/2018 | Erden | |
| 10,311,897 B1* | 6/2019 | Eppler | G11B 5/09 |
| 10,332,547 B1* | 6/2019 | Erden | G11B 5/012 |
| 10,332,557 B1* | 6/2019 | Mendonsa | G11B 23/18 |
| 2005/0152067 A1 | 7/2005 | Yip et al. | |

(Continued)

*Primary Examiner* — Tan X Dinh
(74) *Attorney, Agent, or Firm* — Mueting, Raasch & Gebhardt, P.A.

(57) ABSTRACT

First and second tracks are read simultaneously via a first reader mounted in a head-gimbal assembly. The first reader provides a first signal based on detecting a total perpendicular field of the first and second tracks. The first and second tracks are read simultaneously via a second reader mounted in the head-gimbal assembly. The second reader provides a second signal based on detecting a total longitudinal field of the first and second tracks. At least one of a position error and a timing error of at least one of the first and second readers are determined based on user data read via the respective first and second signals.

15 Claims, 8 Drawing Sheets

(56) References Cited

U.S. PATENT DOCUMENTS

| | | | |
|---|---|---|---|
| 2013/0250447 A1* | 9/2013 | Erden | G11B 5/4886 360/51 |
| 2015/0022916 A1* | 1/2015 | Zou | G11B 5/455 360/31 |
| 2015/0356988 A1* | 12/2015 | Pokharel | G11B 5/6005 360/48 |
| 2017/0287514 A1* | 10/2017 | Rausch | G11B 5/607 |

* cited by examiner

USING SIGNALS FROM PERPENDICULAR AND LONGITUDINAL MULTITRACK MAGNETIC FIELDS FOR ERROR RECOVERY AND/OR SERVO CONTROL

SUMMARY

Various embodiments described herein are generally directed to using perpendicular and longitudinal multitrack magnetic fields for error recovery and/or servo control. In one embodiment, first and second tracks are read simultaneously via a first reader mounted in a head-gimbal assembly. The first reader provides a first signal based on detecting a total perpendicular field of the first and second tracks. The first and second tracks are read simultaneously via a second reader mounted in the head-gimbal assembly. The second reader provides a second signal based on detecting a total longitudinal field of the first and second tracks. At least one of a position error and a timing error of at least one of the first and second readers is determined based on user data read via the respective first and second signals. The at least one of the position error and the timing error are used to respectively reposition the head-gimbal assembly or adjust a time reference of a detector.

In another embodiment, first and second tracks are read simultaneously via a first reader mounted in a head-gimbal assembly. The first reader provides a first signal based on detecting a total perpendicular field of the first and second tracks. The first and second tracks are read simultaneously via a second reader mounted in the head-gimbal assembly. The second reader provides a second signal based on detecting a total longitudinal field of the first and second tracks. A non-convergence is determined when decoding the user data. In response to the non-convergence, a first log-likelihood ratio of the user data estimated from the first signal and a second log-likelihood ratio of the user data estimated from the second signal are determined; a first average of first absolute values of the first log-likelihood ratio and second average of second absolute values of the second log-likelihood ratios are also determined; one of the first and second signals are selected based on a difference between the first and second averages exceeding a threshold; the selected signal is re-read via the respective first or second read transducer using an updated position; and the selected signal is used in an attempt to decode the user data again.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Recording schemes have been developed to increase areal density for conventional magnetic recording (CMR) devices, e.g., perpendicular magnetic recording (PMR) as well as devices using newer technologies, such as heat-assisted magnetic recording (HAMR), microwave-assisted magnetic recording (MAMR) and bit-patterned media (BPM). Other recording schemes such as shingled magnetic recording (SMR) and interlaced magnetic recording (IMR) can also increase areal density by using track formats that overlap tracks to decrease effective track width. Both SMR and IMR can be together used with CMR, HAMR, MAMR, BPM, etc.

These advanced recording schemes may operate on the assumption of a one-dimensional (1-D) system design and drive architecture. On the other hand, magnetic recording media surface, in principle, provides a two-dimensional (2-D) environment. It is the system design and the resulting drive architecture which constrains inherently a 2-D system to 1-D system, mainly because of historical cost and complexity arguments. Thus, in parallel with HAMR and BPM development, the constraints limiting the overall design to 1-D are being further explored to see if the current recording technology can support higher AD and/or better drive performance if some of those constraints are modified by making the system utilize the 2-D nature of the media surface, which is called two-dimensional magnetic recording (TDMR).

In a TDMR device, multiple readers are used, and they sense magnetic fields in one direction, for example, perpendicular to the media surface for PMR. However, based on what is written on the surface of the media and the location of the reader, magnetic fields emerge in other directions which cannot be detected by the current readers employed in today's drives. In particular, a recording scheme referred to herein as vector recording or quadrature recording can increase performance by sensing both perpendicular and in-plane (or longitudinal) magnetic fields. Vector recording generally uses multiple readers over multiple tracks, overall sensing two or more orthogonal magnetic field directions of the recording media.

Figure 1:
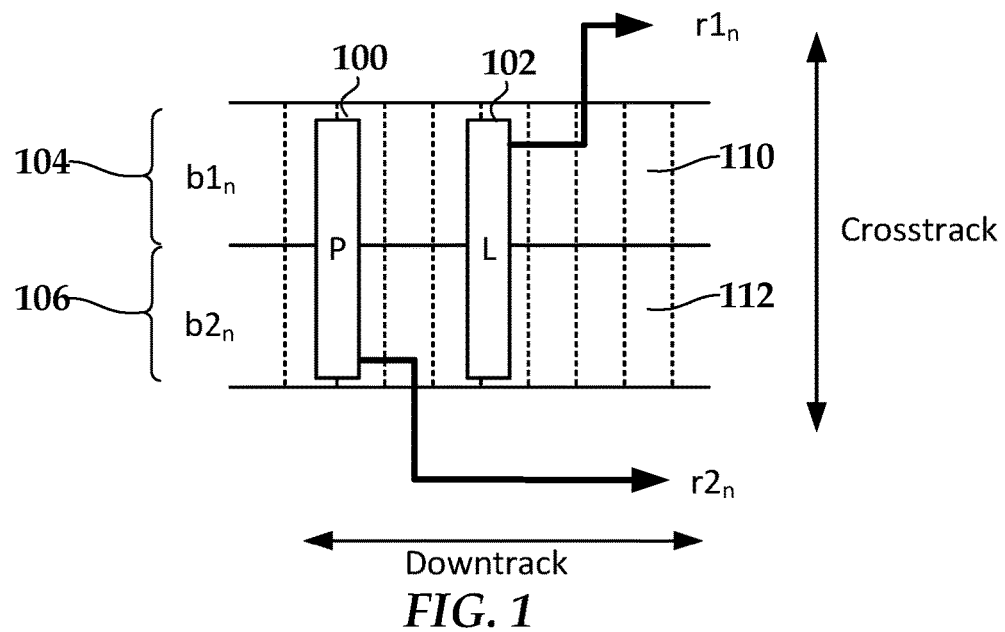
FIG. 1 is a block diagram illustrating a vector recording scheme according to example embodiments.

In FIG. 1, a diagram illustrates a vector recording scheme according to an example embodiment. A first reader 100 (P) (also referred to herein as a read transducer) senses total, multitrack magnetic fields perpendicular to the media surface 104. A second reader 102 (L) senses total, multitrack magnetic fields in a plane parallel to the media surface 104, also referred to as in-plane or longitudinal fields. In response to detecting these fields, the first and second readers 100, 102 provide first and second signals $r1_n$, $r2_n$. Additional details of vector recording are described in U.S. patent application Ser. No. 16/048,768, filed Jul. 30, 2018, which is hereby incorporated by reference in its entirety.

In FIG. 1 and other subsequent figures, the bit boundaries of the tracks are indicated by dashed lines in a cross-track direction. In many of the embodiments described herein, the bits between two adjacent tracks are aligned so that the readers 100, 102 read bits from both tracks at the same time. These bits are referred to herein as aligned or corresponding bits. An example pair of aligned/corresponding bits 110, 112 is shown in tracks 104, 106, respectively. These bits jointly encode data that is read by the individual readers 100, 102 based on the combined magnetic field of the bits 110, 112. Note that the readers 100, 102 are offset in the downtrack direction, and so combining the signals $r1_n$, $r2_n$ from the first and second readers 100, 102 may involve buffering at least one signal as well as detecting and applying a time offset between the signals that corresponds to the downtrack separation of the readers 100, 102 at a particular location where the tracks 104, 106 are moving under the readers.

The first, perpendicular, reader 100 will have a high negative or positive amplitude when the two adjacent track bits 110, 112 are the same, while the reader amplitude will be zero if those bits are different. In the latter case, the opposing fields of the different bits will be detected by the perpendicular reader 100 as zero or nearly so. While reader 100 can be used when the two adjacent track bits 110, 112 are the same, the reader 100 cannot resolve which bits 110, 112 have the positive and negative fields. The second, longitudinal reader 102 can sense signals when bits 110, 112 written at adjacent tracks have different signs, and further can tell which bit is positive and which is negative. This is because a region between the bits 110, 112 will have a crosstrack field in a direction that depends on which bit 110, 112 is positive and which is negative. Thus, the two readers 110, 112 shown in FIG. 1 can be used to jointly detect the bits written at two adjacent tracks, and can also be used to detect timing and position errors of a read head (or head-gimbal assembly) that incorporates the readers 100, 102.

For example, the perpendicular reader 100 is largely insensitive to its cross-track movements as long as it stays within the two tracks 104, 106, which means that the signal captured with this reader 100 can be used for temporal synchronization since it is independent from its spatial movements. The longitudinal reader 102 is sensitive in detecting cross-track movements since its output changes when the reader moves in a cross-track direction. The cross-track behavior of the readers 100, 102 according to an example embodiment is shown in FIGS. 2 and 3.

Figure 2:
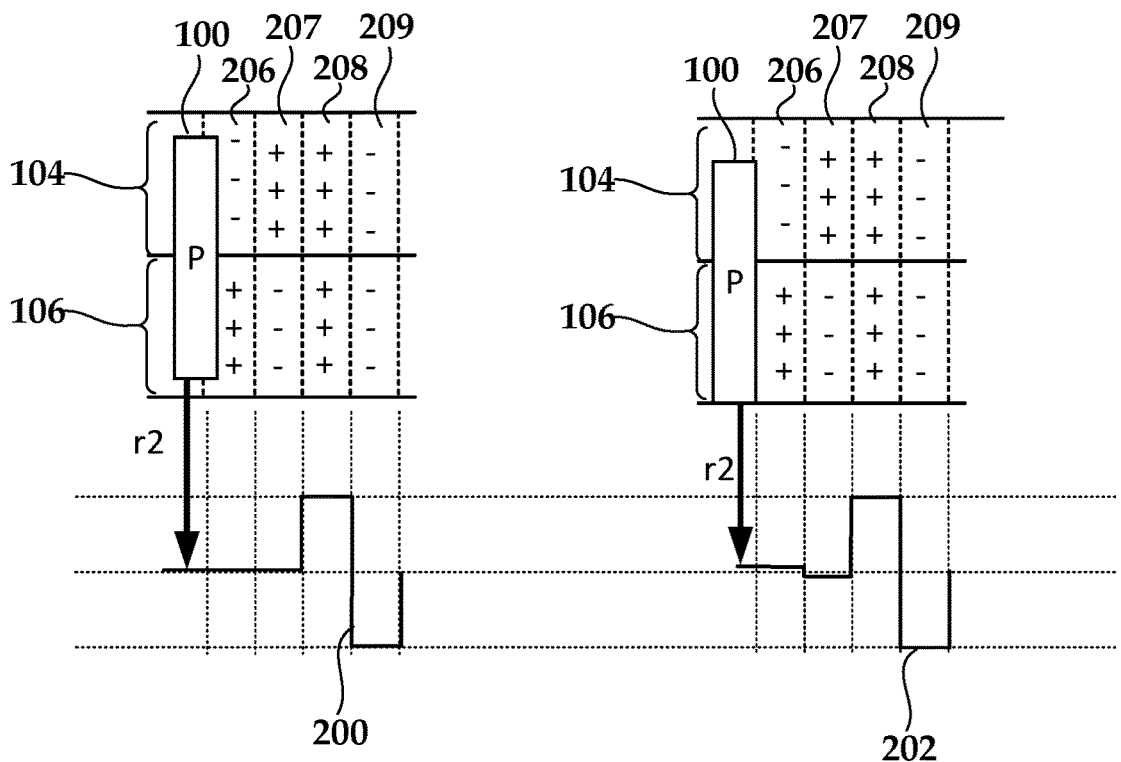
FIGS. 2 and 3 are diagrams showing on-center and off-center signals of perpendicular and longitudinal readers according to example embodiments.

In FIG. 2, curve 200 represents a simplified example of the signal r2 when perpendicular reader 100 is aligned over tracks 104, 106 and curve 202 represents a simplified example of the signal r2 when the perpendicular reader 100 is offset in a crosstrack direction. Bit-pairs 206-209 represent various combinations of magnetic orientations that are read jointly by the reader 100 as it traverses the tracks 104, 106. Because the reader 100 has a total crosstrack width that is less than that of the two tracks 104, 106, curve 202 shows slight deviations from zero for differential bit pairs 206, 207 depending on the amount of misalignment, and no change in total amplitude for identical bit pairs 208, 209 so long as the reader 100 remains within the tracks 104, 106.

Figure 3:
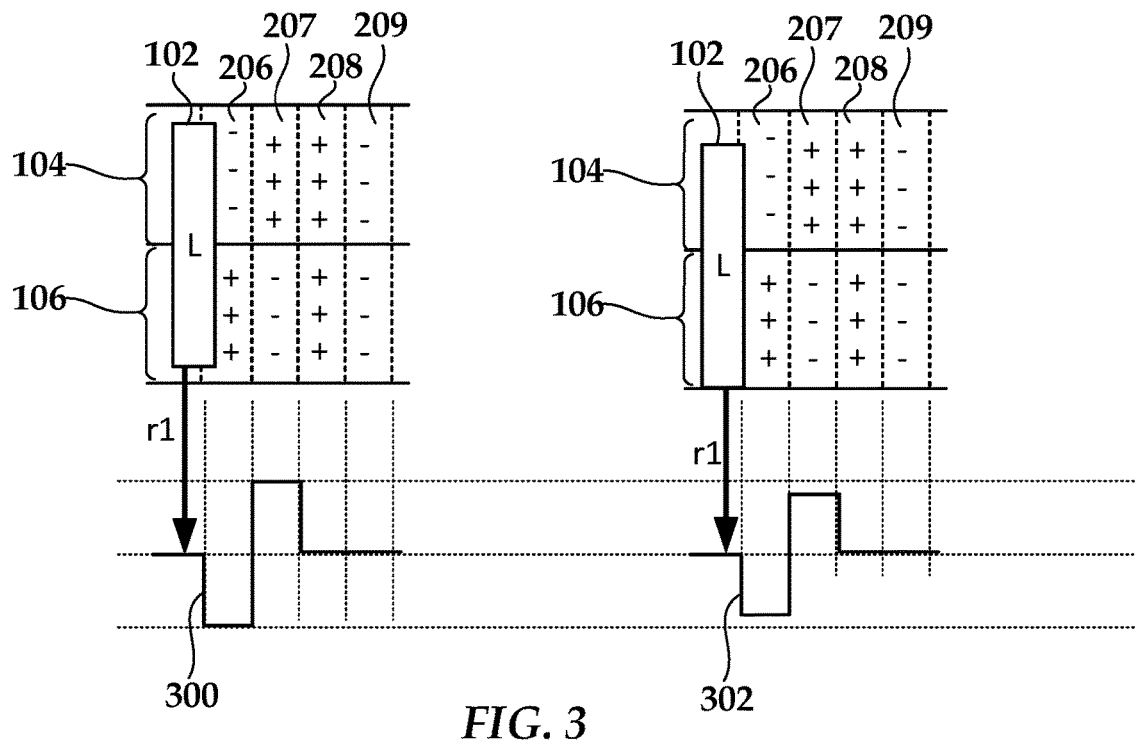

In FIG. 3, curve 300 represents a simplified example of the signal r1 when the longitudinal reader 102 is aligned over tracks 104, 106 and curve 302 represents a simplified example of the signal r1 when the longitudinal reader 102 is offset in a crosstrack direction. The same sequence of bit-pairs 206-209 from FIG. 2 are shown here. Because the reader 102 has a total crosstrack width that is less than that of the two tracks 104, 106, the curve 302 shows a lessening of total amplitude for differential bit pairs 206, 207, and minimum deviation from zero for identical bit pairs 208, 209.

Figure 4:
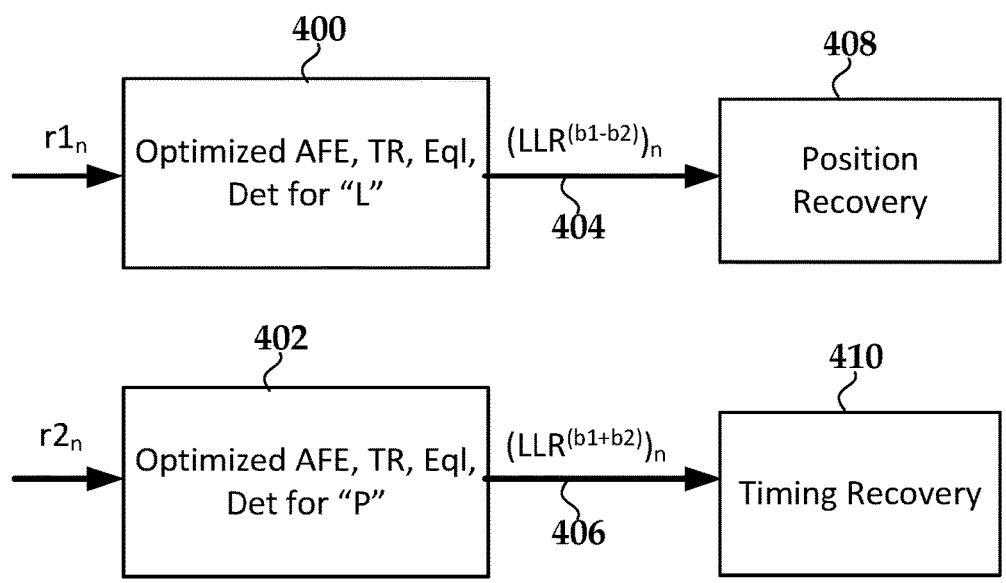
FIG. 4 is a block diagram of a servo and timing processor for perpendicular and longitudinal readers according to an example embodiment.

In FIG. 4, a block diagram shows position and timing recovery architectures according to an example embodiment. A first, independent, 1-D front-end processor 400 has an analog front end (AFE), timing recovery (TR), equalization (Eql), and detector (Det) optimized for the signal r1 received from the longitudinal reader. A second, independent, 1-D front-end processor 402 has components similarly optimized for the signal r2 received from the perpendicular reader. The outputs 404, 406 of these processors 400, 402 are log-likelihood ratios (LLR) values for b1−b2 and b1+b2 at a given time instant "n." The LLR values 404 for b1-b2 are sent to a position recovery loop 408. This loop 408 can be part of a servo controller that changes position of an actuator in order to minimize position errors during tracking. The LLR values 406 for b1+b2 are sent to a timing recovery loop 410. The timing recovery loop 410 may be part of a read channel detector that defines and updates a time reference that estimates bit boundaries within the digitized signals r1 and r2.

Figure 5:
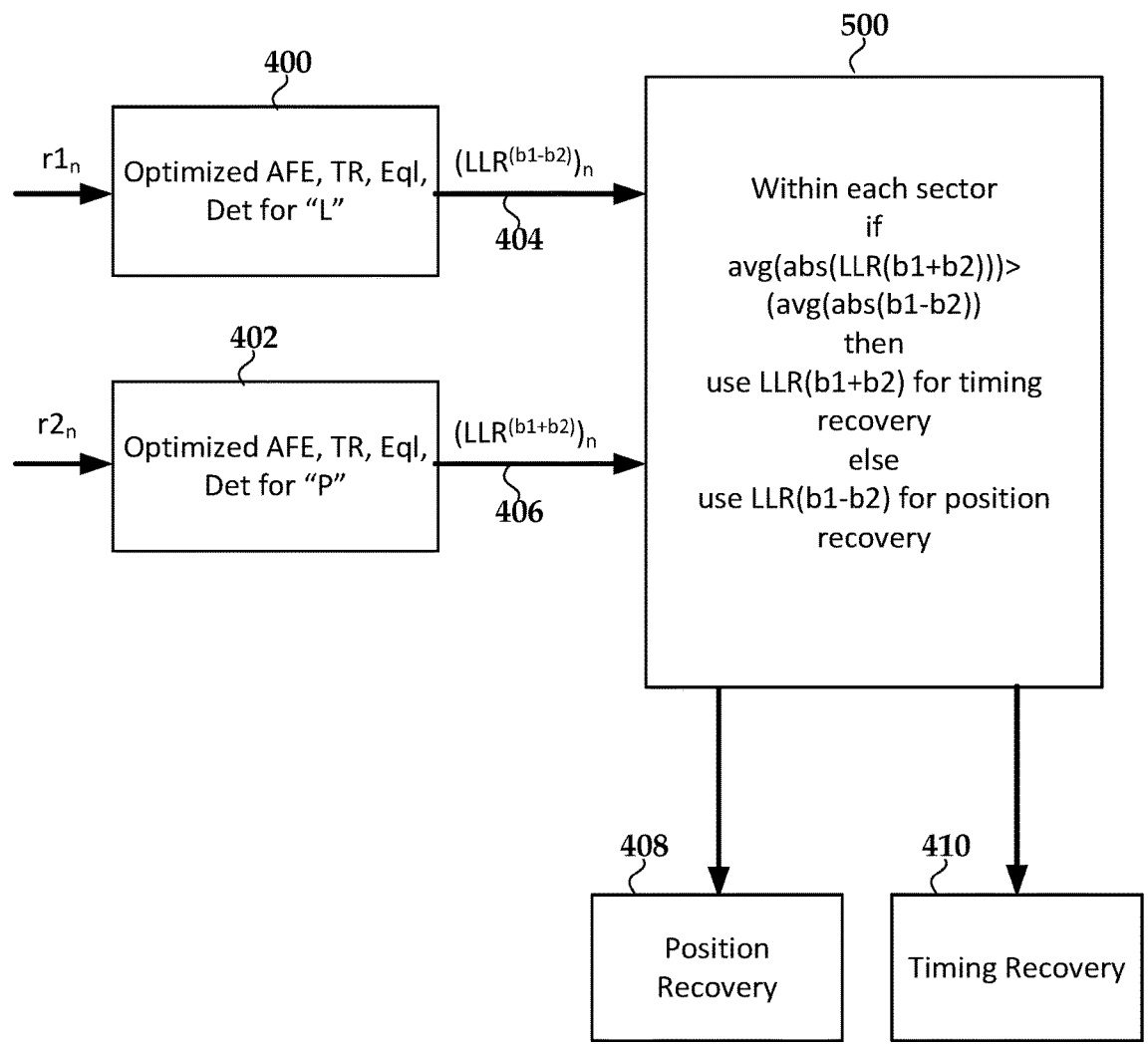
FIG. 5 is a block diagram of a servo and timing processor for perpendicular and longitudinal readers according to another example embodiment.

The architecture shown in FIG. 4 sends all the samples to both the timing and position recovery loops 410, 408. In general, if the LLR is good for one loop the LLR for the other loop is not going to yield much useful information. This increases the number of samples to be processed in each loop, thus increases the system complexity. One update to the architecture in FIG. 4 is shown in the block diagram of FIG. 5. This block uses similar front end processors 400, 402, but uses a decision block 500 that performs a comparison, and decides which sample is good for which synchronization loop. For example, the block 500 selects one of the first and second signals based on which of the first and second log-likelihood ratios 404, 406 has a higher average of absolute values. Just the selected one of the first and second log-likelihood ratios 404, 406 is used to reposition the head-gimbal assembly or adjust the time reference of the detector The embodiments above utilize vector recording to achieve temporal and spatial synchronization using data tracks. This can result in more frequent timing and position recovery. Such a system can be more robust to timing errors, and high bandwidth position updates for position errors, leading to further optimization of overall drive capacity. Further, this may allow fewer or smaller servo marks, which increases format efficiency thereby freeing up space for user data.

Figure 6:
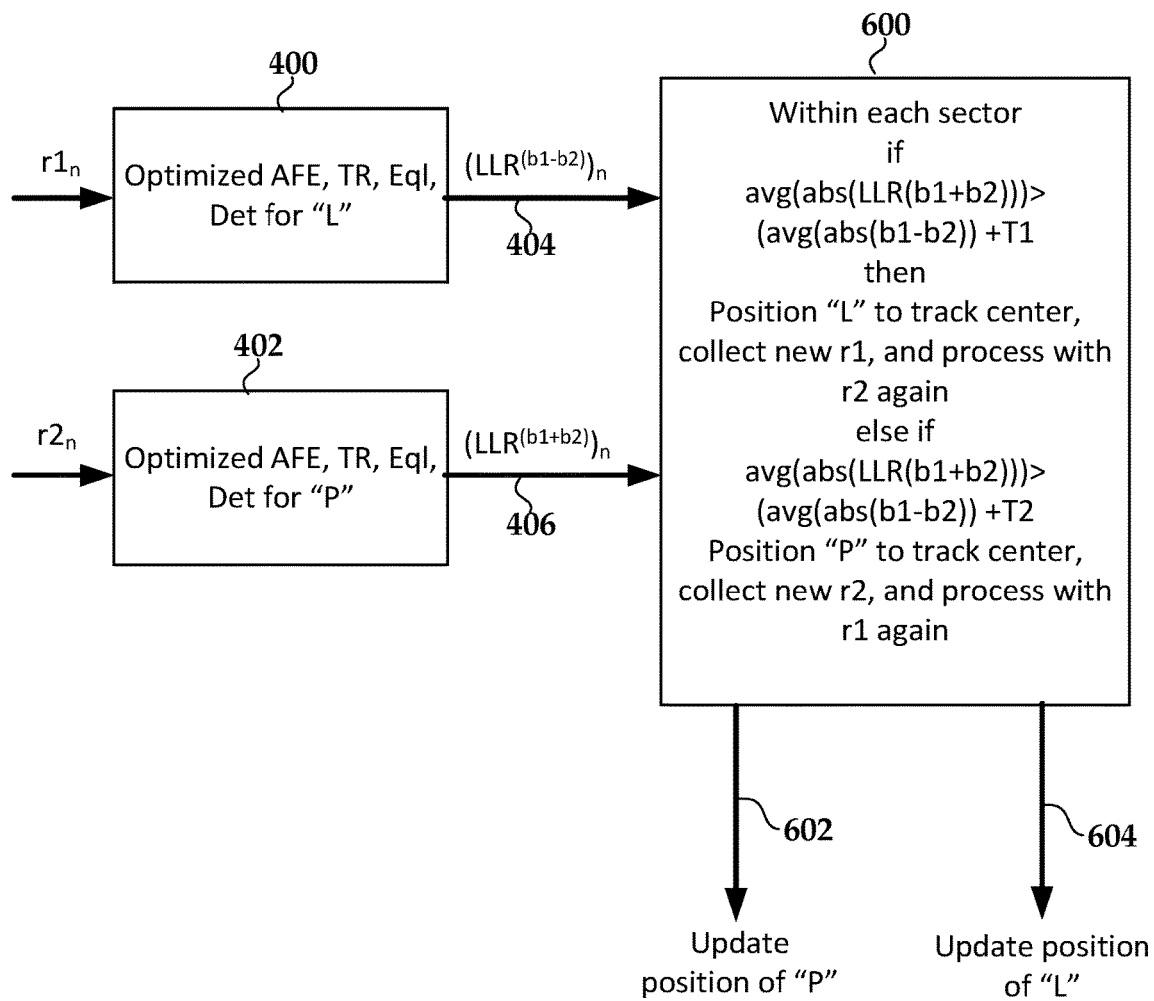
FIG. 6 is a block diagram of an error recovery processor for perpendicular and longitudinal readers according to an example embodiment.

Generally, the front-end processors 400, 402 utilize known coding techniques (e.g., trellis codes) to obtain a decoded value and an indicator of quality of the decoded value (e.g., LLR). In cases where the decoding does not converge on-the-fly, it is sent to an error recovery block. The error recovery block may use various error recovery techniques to recover unconverged sectors such that the unrecovered bit error specification of the drive is met. In vector recording, there is extra information coming from readers sensing more than one magnetic field directions. This extra information can be used in an error recovery block. In FIG. 6, a block diagram shows an error recovery arrangement according to an example embodiment.

As with previous figures, independent front end processors 400, 402 output respective LLR values 404, 406 based on the longitudinal and perpendicular signals r1, r2. The LLR values 404, 406 correspond to estimates for b1−b2 and b1+b2 at a given time instant "n." The LLR values 404, 406 are input to a decision block 600. In the decision block 600, the average LLR values coming from reader "L" are compared with the ones coming from reader "P." If the difference is larger than a predefined threshold, this indicates that one of the readers is further off-track (and the amount of off-track) than the other one. Thus, one of the outputs 602, 604 may be selected that positions the respective "P" or "L" reader on-track. Waveforms corresponding to that sector are read again with that reader, and the re-read waveform is jointly processed with the waveforms of the other reader which were previously read and buffered in memory. Using this technique, the positions of only one reader needs to be changed to affect error recovery. Further, the required set of signals can be collected in a single re-read instead of more than one.

Figure 7:
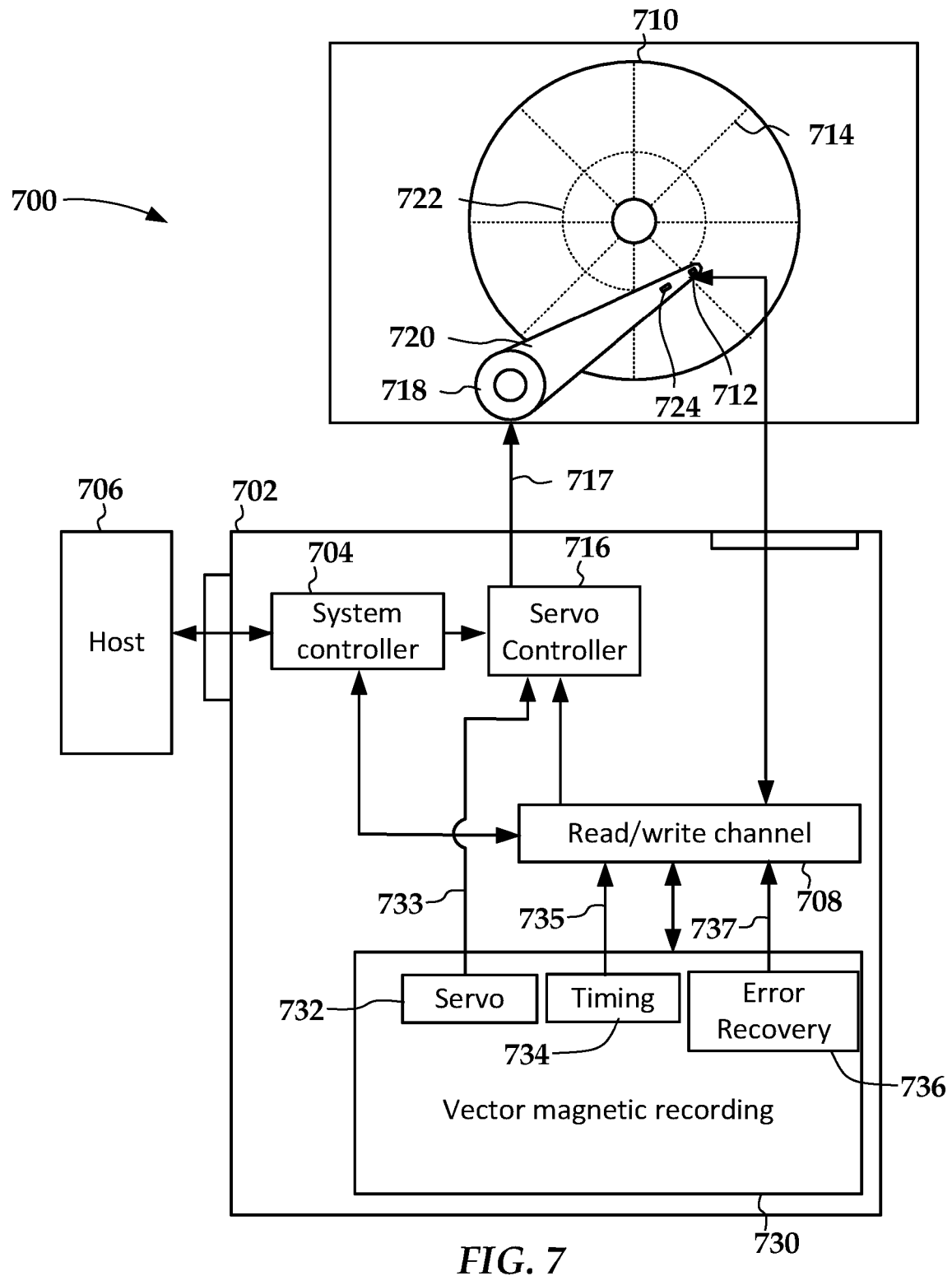
FIG. 7 is a block diagram of an apparatus according to an example embodiment.

In FIG. 7, a diagram illustrates components of a storage drive apparatus 700 that utilizes one or more read/write heads 712 according to example embodiments. The read/write head 712 is mounted to a head-gimbal assembly and at least one of the heads 712 or head-gimbal assemblies is configured with at least first and second read transducers, or readers. The first reader spans two tracks of the disk 710 and provides a first signal responsive to a first total longitudinal field of the tracks. The second signal spans the two and provides a second signal responsive to a second total longitudinal field of the two tracks.

The apparatus 700 includes one or more circuit boards 702 such as a system controller 704 that processes read and write commands and associated data from a host device 706. The host device 706 may include any electronic device that can be communicatively coupled to store and retrieve data from a data storage device, e.g., a computer. The system controller 704 is coupled to a read/write channel 708 that reads from and writes to surfaces of one or more magnetic disks 710. The read/write channel 708 generally converts data between the analog signals used by the heads 712 to the digital data used by the system controller 704 for host communications.

The read/write channel 708 may include analog and digital circuitry such as detectors, timing-correction units, equalizers, error correction units, preamplifiers, filters, digital-to-analog converters, analog-to-digital converters, etc. The read/write channel 708 may have particular features that facilitate reading the first and second signals. For example, the read/write channel may have analog front ends, equalizers, and detectors that are specially tuned for the particular perpendicular and longitudinal fields of the readers as well as the characteristic signals produced by these fields in particular recording patterns.

In addition to processing user data, the read/write channel 708 reads servo data from servo wedges 714 on the magnetic disk 710 via the read/write heads 712. All of the multiple readers of the read/write head may be used to read servo data, or only a subset thereof. The servo data are sent to a servo controller 716, which uses the data to provide position control signals 717 to an actuator such as a voice coil motor (VCM) 718. The VCM 718 rotates an arm 720 upon which the read/write heads 712 are mounted in response to the control signals 717. The position control signals 717 may also be sent to microactuators 724 that individually control each of the read/write heads 712, e.g., causing small displacements at each head. The apparatus 700 may include multiple arms and VCMs (not shown), such that a surface of the disk 710 can be accessed by multiple heads driven by different VCMs.

The apparatus 700 also includes a vector magnetic recording module 730 that assists in detecting and decoding user and servo data via the read transducers on the read/write heads 712. In addition, the vector magnetic recording module 730 may also assist in encoding and writing the data onto multiple tracks via the read/write heads 712. As indicated by block 732, the vector magnetic recording module 730 includes a servo function that determines a position error of at least one of the first and second readers based on user data read via one or both of the longitudinal and perpendicular fields detected via the readers. The servo function 732 uses the position error to reposition the head-gimbal assembly, e.g., via inputs to the servo controller 716. For example, the servo function 732 may extract a position error signal 733 from signal generated from the longitudinal field. The position error signal 733 can be used to reposition a head-gimbal assembly in which the readers are integrated.

As indicated by block 734, the vector magnetic recording module 730 includes a timing function that determines a timing error of at least one of the first and second readers based on user data read via the longitudinal and perpendicular fields detected via the readers. The servo function 732 uses the position error to correct timing for bit transitions read from the data tracks, e.g., via inputs to the read/write channel 708. For example, the servo function 732 may extract a timing error signal from signal generated from the perpendicular field. The timing error signal may be used to adjust a time reference of a detector of the read/write channel 708.

As indicated by block 736, the vector magnetic recording module 730 includes an error recovery function that determines an error 737 (e.g., position error) of at least one of the first and second readers based on user data read via the longitudinal and perpendicular fields detected via the readers. The servo function 732 uses the error 737 to cause the read/write channel 708 to re-read the affected data at a different setting to compensate for the error, e.g., re-read the track at a different track position via an input to the servo controller 716.

Figure 8:
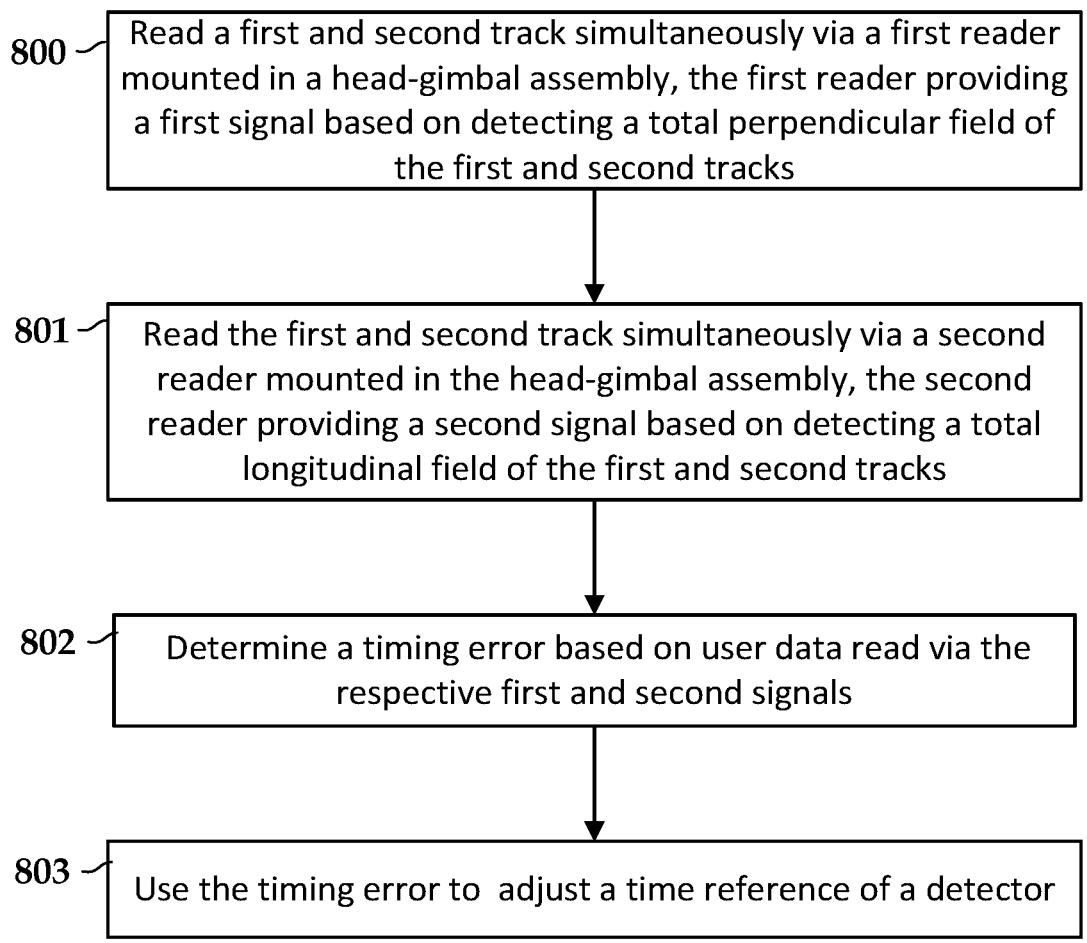
FIGS. 8, 9, and 10 are flowcharts of methods according to example embodiments.

In reference now to FIG. 8, a flowchart illustrates a method according to an example embodiment. The method involves reading 800 a first and second track simultaneously via a first reader mounted in a head-gimbal assembly. The first reader provides a first signal based on detecting a total perpendicular field of the first and second tracks. The first and second tracks are read 801 simultaneously via a second reader mounted in the head-gimbal assembly. The second reader provides a second signal based on detecting a total longitudinal field of the first and second tracks. A timing error of at least one of the first and second readers is determined 802 based on user data read via the respective first and second signals. The timing error is used 803 to adjust a time reference of a detector.

Figure 9:
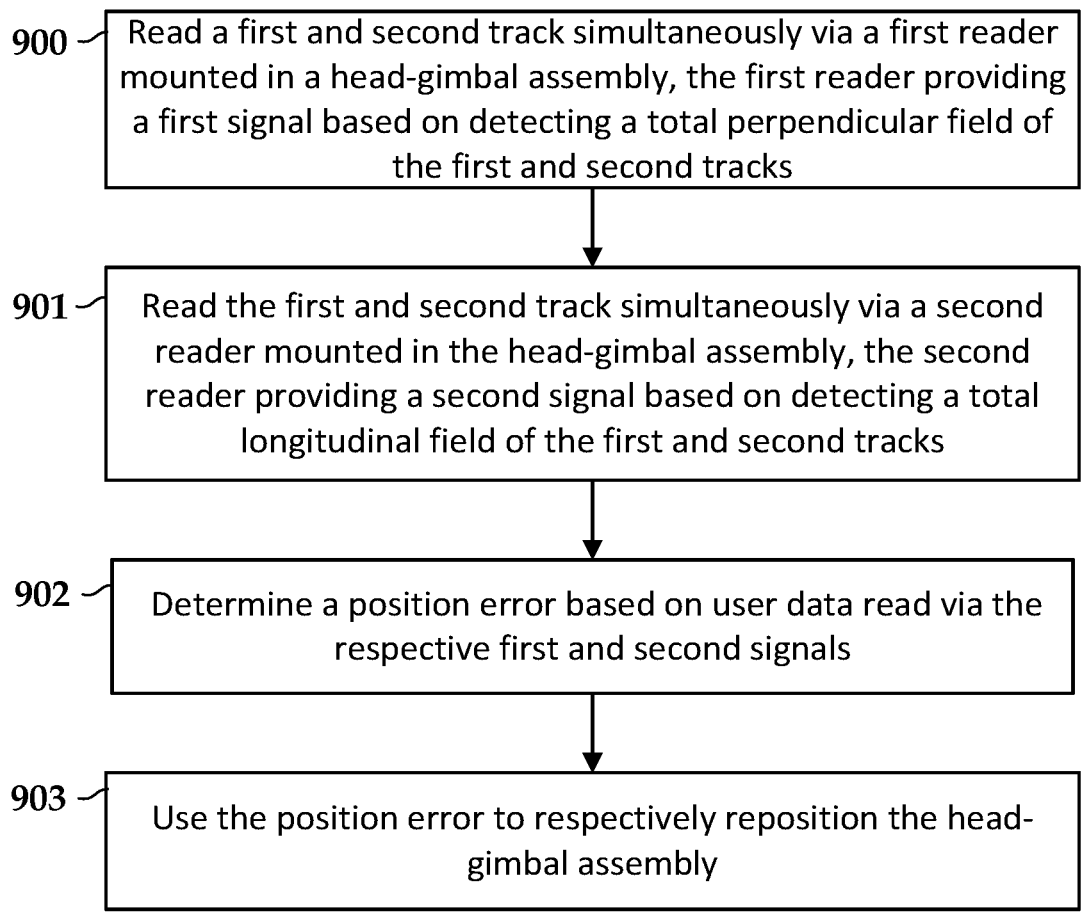

In reference now to FIG. 9, a flowchart illustrates a method according to an example embodiment. The method involves reading 900 a first and second track simultaneously via a first reader mounted in a head-gimbal assembly. The first reader provides a first signal based on detecting a total perpendicular field of the first and second tracks. The first and second tracks are read 901 simultaneously via a second reader mounted in the head-gimbal assembly. The second reader provides a second signal based on detecting a total longitudinal field of the first and second tracks. A position error of at least one of the first and second readers is determined 902 based on user data read via the respective first and second signals. The position error is used 903 to reposition the head-gimbal assembly.

Figure 10:
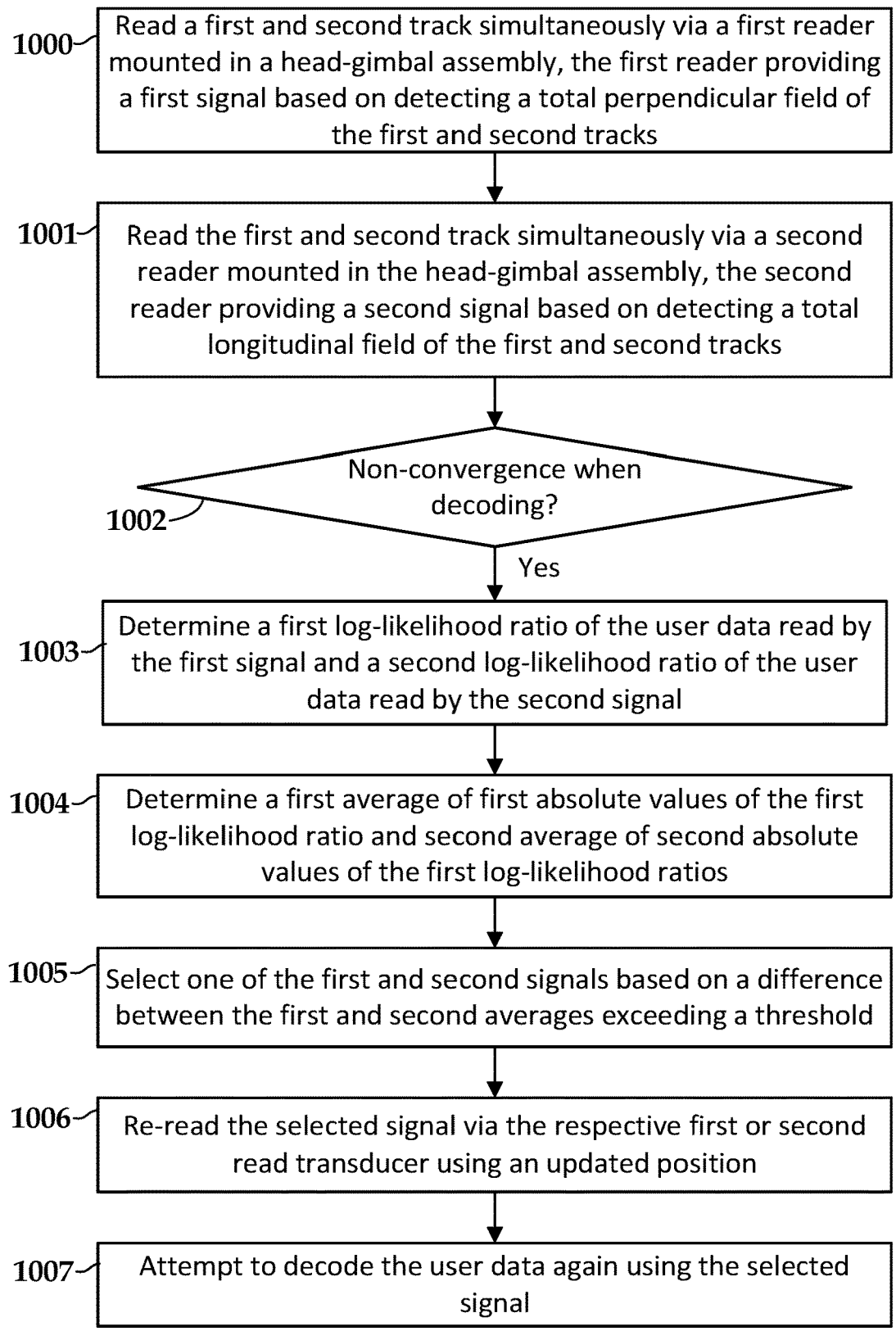

In reference now to FIG. 10, a flowchart illustrates a method according to an example embodiment. The method involves reading 1000 a first and second track simultaneously via a first reader mounted in a head-gimbal assembly. The first reader provides a first signal based on detecting a total perpendicular field of the first and second tracks. The first and second tracks are read 1001 simultaneously via a second reader mounted in the head-gimbal assembly. The second reader provides a second signal based on detecting a total longitudinal field of the first and second tracks.

In response to determining 1002 a non-convergence when decoding the user data, a first log-likelihood ratio of the user data read by the first signal and a second log-likelihood ratio of the user data read by the second signal are determined 1003. A first average of first absolute values of the first log-likelihood ratio and second average of second absolute values of the first log-likelihood ratios are also determined 1004. One of the first and second signals are selected 1005 based on a difference between the first and second averages exceeding a threshold. The selected signal is re-read 1006 via the respective first or second read transducer using an updated position and the selected signal is used in an attempt 1007 to decode the user data again.

Note that in any of the above embodiments, the two or more readers are generally configured to provide the two or more signals simultaneously, because all of the readers may be mounted on the same head or head-gimbal assembly that is held over the multiple tracks at the same time. Because the readers may have a fixed or known downtrack offset from each other, the decoding of user data may also involve buffering or otherwise time-delaying processing on some or all of the signals so that portions of the signals corresponding to aligned bits of adjacent tracks can be processed together.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description, and is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   reading a first and second track simultaneously via a first reader mounted in a head-gimbal assembly, the first reader providing a first signal based on detecting a total perpendicular field of the first and second tracks;
   reading the first and second track simultaneously via a second reader mounted in the head-gimbal assembly, the second reader providing a second signal based on detecting a total longitudinal field of the first and second tracks;
   determining at least one of a position error and a timing error of at least one of the first and second readers based on user data read via the respective first and second signals; and
   using the at least one of the position error and the timing error to respectively reposition the head-gimbal assembly or adjust a time reference of a detector.

2. The method of claim 1, wherein the position error is based on the user data read by the second signal.

3. The method of claim 1, wherein the wherein the timing error is based on the user data read by the first signal.

4. The method of claim 1, further comprising determining a first log-likelihood ratio of the user data read by the first signal and a second log-likelihood ratio of the user data read by, the second signal, wherein the at least one of the position error and the timing error are based on the respective first and second log-likelihood ratios.

5. The method of claim 4, further comprising:
   selecting one of the first and second signals based on which of the first and second log-likelihood ratios has a higher average of absolute values; and
   using just the selected one of the first and second log-likelihood ratios to reposition the head-gimbal assembly or adjust the time reference of the detector.

6. The method of claim 4, further comprising:
   determining a non-convergence when decoding the user data;
   determining a first average of first absolute values of the first log-likelihood ratio and second average of second absolute values of the first log-likelihood ratios;
   selecting one of the first and second signals based on a difference between the first and second averages exceeding a threshold; and
   re-reading the selected signal via the respective first or second read transducer using an updated position.

7. The method of claim 6, further comprising decoding the user data with the re-read selected signal and another of the first and second signals that was not selected.

8. The method of claim 4, wherein the first and second log likelihood ratios are determined via respective first and second one-dimensional front end processors optimized for the respective first and second signals.

9. An apparatus, comprising:
   interface circuitry operable to read first and second readers mounted in a common head-gimbal assembly, the first reader and second readers providing respective first and second signals based on detecting respective total perpendicular and total longitudinal fields of the first and second tracks, respectively;
   a controller coupled to the interface circuitry and operable to:
     read the first and second signals;
     determine at least one of a position error and a timing error of at least one of the first and second readers based on user data read via the respective first and second signals; and
     use the at least one of the position error and the timing error to respectively reposition the head-gimbal assembly or adjust a time reference of a detector.

10. The apparatus of claim 9, wherein the position error is based on the user data read by the second signal.

11. The apparatus of claim 9, wherein the wherein the timing error is based on the user data read by the first signal.

12. The apparatus of claim 9, wherein the controller is further operable to determine a first log-likelihood ratio of the user data read by the first signal and a second log-likelihood ratio of the user data read by the second signal, wherein the at least one of the position error and the timing error are based on the respective first and second log-likelihood ratios.

13. The apparatus of claim 12, wherein the controller is further operable to:
- select one of the first and second signals based on which of the first and second log-likelihood ratios has a higher average of absolute values; and
- use just the selected one of the first and second log-likelihood ratios to reposition the head-gimbal assembly or adjust the time reference of the detector.

14. The apparatus of claim 12, wherein the controller is further operable to:
- determine a non-convergence when decoding the user data;
- determine a first average of first absolute values of the first log-likelihood ratio and second average of second absolute values of the first log-likelihood ratios;
- select one of the first and second signals based on a difference between the first second averages exceeding a threshold; and
- re-read the selected signal via the respective first or second read transducer using an updated position.

15. The apparatus of claim 14, wherein the controller is further operable to decode the user data with the re-read selected signal and another of the first and second signals that was not selected.

* * * * *